US005339634A

United States Patent [19]

Gale et al.

[11] Patent Number: 5,339,634

[45] Date of Patent: Aug. 23, 1994

[54] FUEL SUPPLY SYSTEM FOR ENGINES AND COMBUSTION PROCESSES THEREFOR

[75] Inventors: Nigel F. Gale; David W. Naegeli; Thomas W. Ryan, III; Steven R. King, all of San Antonio, Tex.

[73] Assignee: Southwest Research Institute, San Antonio, Tex.

[21] Appl. No.: 74,711

[22] Filed: Jun. 9, 1993

Related U.S. Application Data

[63] Continuation of Ser. No. 846,025, Mar. 5, 1992, abandoned.

[51] Int. Cl.$^5$ .......... F02C 1/00

[52] U.S. Cl. .......... 60/723; 431/7

[58] Field of Search .......... 60/723, 732, 39.02, 60/39.06; 431/7, 170; 123/1 A, 3

[56] References Cited

U.S. PATENT DOCUMENTS

| | | | |
|---|---|---|---|
| 3,974,096 | 8/1976 | Segura et al. | 252/439 |
| 4,041,910 | 8/1977 | Houseman . | |
| 4,054,644 | 10/1977 | Segura et al. | 423/655 |
| 4,059,076 | 11/1977 | Kosaka et al. . | |
| 4,079,703 | 3/1978 | Yamane et al. . | |
| 4,108,114 | 8/1978 | Kosaka et al. . | |
| 4,121,912 | 10/1978 | Barber et al. | 60/39.02 |
| 4,131,086 | 12/1978 | Noguchi et al. . | |
| 4,131,095 | 12/1978 | Ouchi . | |
| 4,181,100 | 1/1980 | Yamane et al. . | |
| 4,244,328 | 1/1981 | Lindstrom . | |
| 4,567,857 | 2/1986 | Houseman et al. | 123/3 |
| 4,573,435 | 3/1986 | Shelton . | |
| 4,731,989 | 3/1988 | Furuya et al. | 60/723 |
| 4,787,208 | 11/1988 | DeCorso | 60/723 |
| 5,000,004 | 3/1991 | Yamanaka et al. | 60/723 |

FOREIGN PATENT DOCUMENTS

| | | | |
|---|---|---|---|
| 0014938 | 1/1985 | Japan | 60/723 |

*Primary Examiner*—Richard A. Bertsch
*Assistant Examiner*—Timothy S. Thorpe
*Attorney, Agent, or Firm*—Baker & Botts

[57] ABSTRACT

An engine is provided which, in at least one cylinder or combustion area, is provided with a hydrocarbon rich fuel which produces upon combustion an exhaust gas containing unburned hydrocarbons, water vapor and carbon monoxide. The exhaust gas is treated in a catalytic converter and the reaction process that occurs therein produces hydrogen and carbon dioxide which is mixed with air to form a hydrocarbon lean, hydrogen enriched mixture. The mixture is subsequently ignited in other cylinders or combustion areas of the engine to produce power.

13 Claims, 1 Drawing Sheet

FUEL SUPPLY SYSTEM FOR ENGINES AND COMBUSTION PROCESSES THEREFOR

CROSS REFERENCE TO RELATED APPLICATIONS

This application is a continuation of application Ser. No. 07/846,025 filed Mar. 5, 1992, entitled "Fuel Supply Systems for Engines and Combustion Processes Therefor" by Nigel F. Gale, David W. Naegeli, Thomas W. Ryan III and Steven R. King, now abandoned.

TECHNICAL FIELD OF THE INVENTION

This invention relates generally to engines. More particularly, but not by way of limitation, this invention relates to improved fuel supply systems and combustion processes for both reciprocating and gas turbine engines wherein hydrogen gas and hydrocarbon fuels are utilized in the engine.

BACKGROUND OF THE INVENTION

Attempts have been made in the past to produce engines which utilize a portion of the cylinders for generating a hydrogen rich exhaust gas which is then combined with hydrocarbon fuel in a carburetor and delivered to the remaining cylinders of the engine for combustion, One such system is illustrated in U.S. Pat. No. 4,041,910, issued to John Houseman on Aug. 16, 1977. A similar system is illustrated in U.S. Pat. No. 4,108,114, issued to Katuaki Kosaka, et al. on Aug. 22, 1978. In each of the above patents, the exhaust gas is virtually untreated and is returned to the cylinder for the complete combustion of the unburned hydrocarbons and any free hydrogen that may be contained therein.

U.S. Pat. No. 4,059,076 issued to Katuaki Kosaka, et al. on Nov. 22, 1977, illustrates use of a separate engine for generating a hydrogen rich exhaust gas which is subsequently burned in the main power engine. In the system described in the '076 patent, the exhaust gas is mixed with hydrocarbon fuel and then passed through a catalytic converter prior to being delivered to the main power engine.

An object of this invention is to provide an improved fuel system and combustion process for use with both reciprocating and gas turbine engines wherein hydrogen rich exhaust gas is generated in the engine, passed through a water-gas shift catalyst to further increase its hydrogen content, then mixed with a lean hydrocarbon fuel for burning in the remainder of the engine.

SUMMARY OF THE INVENTION

In one aspect, this invention provides an improved fuel combustion process that reduces emissions of unburned hydrocarbons, carbon monoxide and oxides of nitrogen. The process includes the steps of burning a hydrocarbon rich fuel in a first combustion chamber in the engine; producing an exhaust gas containing carbon monoxide, oxides of nitrogen, unburned hydrocarbons, water vapor and hydrogen; catalytically shifting the carbon monoxide and water in the exhaust gas to a mixture containing hydrogen and carbon dioxide; mixing the mixture with hydrocarbon lean fuel to form a hydrogen enriched inlet gas; and burning the inlet gas in a second combustion chamber in the engine to power the engine and produce engine exhaust containing reduced amounts of unburned hydrocarbons and reduced amounts of oxides of nitrogen.

In another aspect, this invention provides an improved engine fuel supply system that includes: a first fuel supply for supplying a hydrocarbon enriched fuel to a first combustion chamber in the engine for producing exhaust gas containing carbon monoxide, oxides of nitrogen, unburned hydrocarbons, water vapor and hydrogen; a second fuel supply for supplying hydrocarbon lean fuel to a second combustion chamber in the engine; conduit means connecting the combustion chambers; and a water-gas shift catalyst located in the conduit for receiving the exhaust gas from the first combustion chamber, for converting the carbon monoxide and water in the exhaust gas to a mixture containing hydrogen and carbon dioxide and for delivering the mixture to a second combustion chamber wherein the mixture and hydrocarbon lean fuel are mixed and burned to power the engine, producing an exhaust having reduced amounts of oxides of nitrogen and reduced amounts of unburned hydrocarbons.

BRIEF DESCRIPTION OF THE DRAWING

The foregoing and additional objects and advantages of the invention will become more apparent as the following detailed description is read in conjunction with the accompanying drawing, wherein like reference characters denote like parts in all views and wherein.

DETAILED DESCRIPTION OF THE PREFERRED EMBODIMENT

Figure 1:
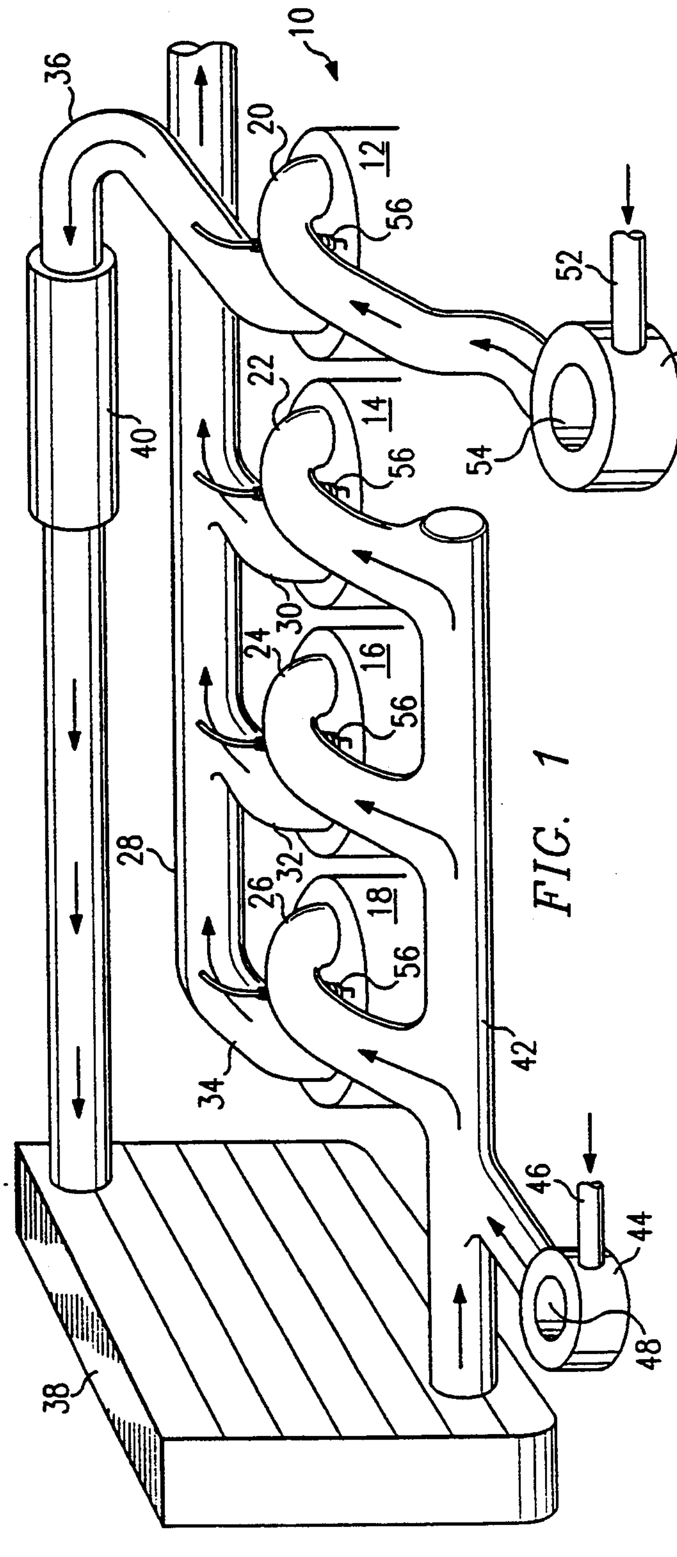
FIG. 1 illustrates a fuel supply system constructed in accordance with the invention that is utilized in connection with a reciprocating engine.

Referring to the drawing and to FIG. 1 in particular, schematically illustrated therein, is an engine generally designated by the reference character 10 that includes a plurality of cylinders 12, 14, 16 and 18. The cylinders are each provided with an intake port connected to intake pipes 20, 22, 24 and 26, respectively. The engine 10 also includes an exhaust manifold 28 that is connected to the cylinders 14, 16 and 18 to exhaust ports and connecting exhaust pipes 30, 32 and 34.

The cylinder 12 also includes an exhaust port. An exhaust pipe or conduit 36 extends from the exhaust port of the cylinder 12 to an intercooler or heat exchanger 38. Connected into the exhaust pipe 36 is a catalytic converter 40. The converter 40 preferably includes a nickel or platinum catalyst. The catalyst is effective in a water-gas shift reaction with the exhaust gas.

An intake manifold 42 extends from the intercooler 38 to the intake pipes 22, 24 and 26. Carburetor 44 is connected to the intake manifold 42 and is provided for the purpose of mixing fuel and air and delivering a hydrocarbon lean fuel into the intake manifold 42. Fuel supply pipe 46 is connected with the carburetor 44. Air for mixing with the fuel in the carburetor 44 is drawn in through a filtered opening 48 in the carburetor 44.

A second carburetor 50 is connected through the intake pipe 20 to the cylinder 12. Like the carburetor 44, the carburetor 50 also includes a fuel supply pipe 52 and an air intake port 54 which is generally filtered, for allowing air in the carburetor to mix with the fuel. The carburetor 50 provides a hydrocarbon rich fuel for delivery to the engine 10.

Each of the cylinders is also provided with a spark plug 56 or similar fuel igniting device for initiating combustion of fuel in each of the cylinders. Although not shown, it will be understood that appropriate fuel control or throttling devices and appropriate ignition controls will be provided for the engine 10.

Operation of the Embodiment of FIG. 1

In the operation of the engine 10, a hydrocarbon rich fuel/air mixture is formed in the carburetor 50 and delivered to the intake pipe 20 of the cylinder 12. In the cylinder 12, the fuel is ignited by the spark plug 56. Since the fuel is hydrocarbon rich and well above the stoichiometric range, few oxides of nitrogen are produced during combustion. However, substantial amounts of unburned hydrocarbon, carbon monoxide, water vapor, carbon dioxide and hydrogen are produced. Exhaust gas from the cylinder 12 is expelled through the exhaust conduit 36, passing through the catalytic converter 40.

In the catalytic converter 40, the carbon monoxide and water in the exhaust gas are converted to additional hydrogen and carbon dioxide. This process is well known as the water-gas shift reaction. Chemically, the water-gas shift reaction may be represented as $$CO+H_2=H_2+CO_2$$

In the reaction, the carbon monoxide in the exhaust is exchanged for hydrogen. The water-gas shift reaction is exothermic by 9k cal/mol and the equilibrium constant is about 30 at 1,000K (1341° F.), so the indicated result of the reaction is that formation of hydrogen and carbon dioxide are favored. In the presence of a catalyst, the reaction is fast so equilibrium is established rapidly. Suitable catalytic materials include nickel, platinum, cobalt, ruthenium and palladium. In some instances, combinations may be used advantageously.

After the exhaust passes through the catalytic converter 40 it enters the intercooler 38 where the temperature of the hydrogen enriched exhaust gas is lowered enough to prevent premature combustion when the gas is mixed with air. The exhaust gas enters the inlet manifold 42 and mixes with a fuel-lean hydrocarbon-air mixture which is provided by the carburetor 44, forming an inlet fuel mixture that is hydrogen enriched and hydrocarbon lean. The inlet fuel mixture enters the cylinders 14, 16 and 18 through the corresponding intake pipes 22, 24 and 26 where the inlet fuel mixture is burned to provide power to the engine 10.

Exhaust gases produced upon combustion of the inlet mixture in the cylinders 14, 16 and 18 contain little, if any, unburned hydrocarbons. It contains also a substantially reduced amount of oxides of nitrogen as compared to the usual exhaust gases.

Figure 2:
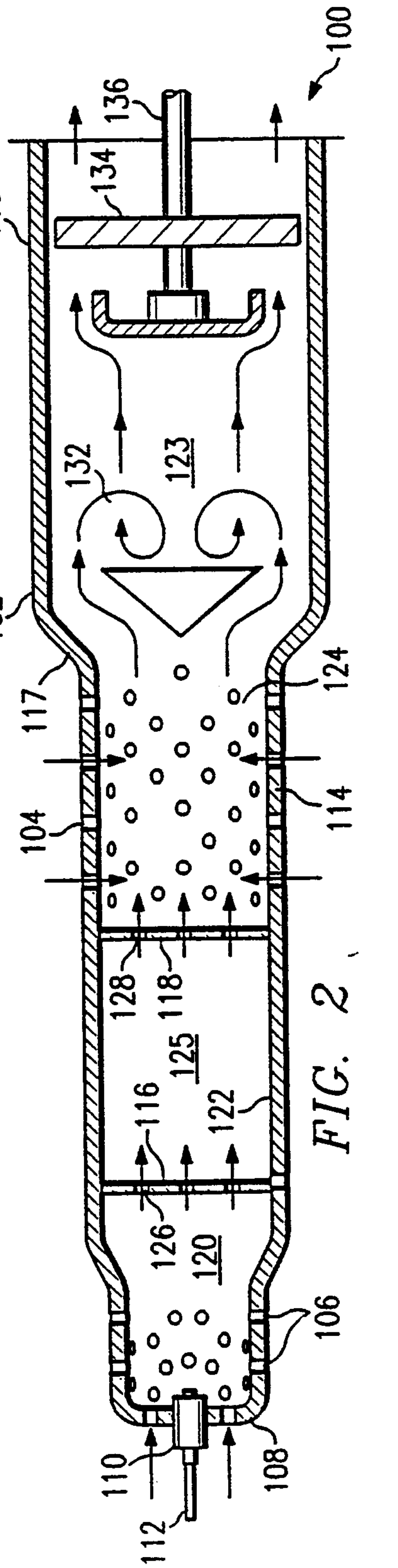
FIG. 2 is a cross-sectional view illustrating a fuel supply system that is also constructed in accordance with the invention and showing the system applied to a gas turbine engine.

The Embodiment of FIG. 2

Referring to the drawing and to FIG. 2, shown therein and generally designated by the reference character 100 is a portion of a gas turbine engine. The portion of the gas turbine engine 100 shown may be generally referred to as the combustor section of the engine.

The gas turbine engine 100 includes a generally tubular outer housing 102 having perforations 104 extending therethrough. Perforations 106 are provided in a closed end 108 of the housing 102. A gas nozzle 110 extends through the end 108 and is connected by conduit 112 with a source of fuel.

A reduced diameter portion 114 of the housing 102 is disposed coaxially with a larger diameter portion 115 of the housing 102 and is connected with the housing 102 by the transition portion 117 as illustrated in FIG. 2. Spaced partitions 116 and 118 are located within the portion 114 and divide the housing 102 into four chambers 120, 122, 123 and 124. The portion 114 forms a conduit from the chamber 120 to the chamber 124. A catalytic converter 125 is located in the chamber 122. The catalytic converter 125 contains one or more of the catalysts listed hereinbefore.

The chamber 120 receives a fuel charge from the nozzle 110 and receives air through the ports 106 forming a hydrocarbon rich fuel. Although not illustrated, an igniter will be located in chamber 120 which initiates combustion of the completely premixed fuel/air mixture.

In order to maintain the oxides of nitrogen low, the fuel in the chamber 120 is supplied hydrocarbon rich, that is, the fuel/air ratio is above stoichiometric. Since the fuel is rich, it provides a substantial amount of unburned hydrocarbon, carbon monoxide, and water vapor in the exhaust gas created by the combustion in the chamber 120.

Exhaust ports 126 are provided in the partition 116 and exhaust ports 128 are provided in the partition 118. Accordingly, combustion of the fuel in the chamber 120 generates exhaust gases which pass through the ports 126, through the catalytic converter 125 located in the chamber 122, and exit through the ports 128 into the chamber 124. The chamber 124 is a mixing chamber wherein the gases passing through the converter are mixed with air.

As previously described in connection with FIG. 1, exhaust gases passing through the catalytic converter 125 are subjected to the water-gas shift reaction with the resulting production of hydrogen and carbon dioxide.

The gases exiting from the catalytic converter 125 are mixed with air which is drawn in through the ports 104 in the portion 114 of the housing 102. The arrangement is such that the fuel/air mixture in the chamber 124 will be hydrocarbon lean and hydrogen enriched. That is, the fuel/air ratio is below stoichiometric.

The fuel and air are mixed in the chamber 124 passing outwardly therefrom into the enlarged portion 115 of the housing 102 wherein the mixture will be ignited in ignition chamber 123 in the area indicated by the reference character 132. Gases produced by the ignition at 132 are directed through a turbine wheel 134 which is attached to and causes rotation of the shaft 136.

It should be pointed out that the gases resulting from the combustion at 132 will contain no unburned hydrocarbons and contain very low oxides of nitrogen.

Operation of the Embodiment of FIG. 2

When it is desired to operate the gas turbine engine 100, a premixed mixture of fuel and air is admitted into the chamber 120 where ignition occurs. Exhaust gases pass through the ports 126 and through the catalytic converter 125 in the chamber 122 wherein the water-gas shift reaction occurs producing an exhaust gas containing hydrogen and carbon dioxide. This exhaust gas is then mixed with air in the chamber 124 and ignited at 132 to produce exhaust gas which drives the turbine wheel 134 and the attached shaft 136. The exhaust gas is essentially, if not totally, free of unburned hydrocarbons and will contain very low amounts of oxides of nitrogen.

From the foregoing, it will be appreciated that an engine constructed in accordance with the invention, whether a reciprocating engine or gas turbine engine, includes a fuel supply system and a fuel combustion process that provide efficient and adequate power to drive the engine while at the same time substantially reducing the emissions of unburned hydrocarbons and oxides of nitrogen into the atmosphere.

The foregoing embodiments, which have been described in detail, are presented by way of example only and it will be understood that many changes and modifications can be made thereto without departing from the spirit of the invention.

What is claimed is:

1. A fuel combustion process for multicylinder engines that reduces emissions of unburned hydrocarbons, carbon monoxide and oxides of nitrogen in the engine exhaust, the process includes the steps of:

burning a hydrocarbon rich fuel in at least one engine cylinder to produce exhaust gas containing carbon monoxide, oxides of nitrogen, unburned hydrocarbons, water vapor and hydrogen;

reacting the exhaust gas in the presence of a water-gas shift catalyst to produce a mixture containing increased hydrogen and carbon dioxide;

mixing said mixture with a hydrocarbon lean fuel to form a hydrogen enriched inlet gas; and burning said inlet gas in the remaining engine cylinders to power said engine and producing engine exhaust containing reduced amounts of unburned hydrocarbons and reduced amounts of oxides of nitrogen.

2. An improved multi-cylinder engine fuel supply system that comprises:

first carburetor means for supplying hydrocarbon rich fuel to at least one cylinder;

conduit means connected with an exhaust port of at least one cylinder and with an inlet port of each remaining cylinder of said engine for delivering exhaust gas containing carbon monoxide, water vapor, oxides of nitrogen, and unburned hydrocarbons from said at least one cylinder to the inlet port of each said remaining cylinder;

water-gas shift catalyst means located in said conduit means for producing a mixture containing hydrogen and carbon dioxide; and second carburetor means for supplying a hydrocarbon lean fuel to said conduit means for mixing with said mixture forming a hydrogen enriched inlet gas and for supplying said inlet gas to said inlet ports.

3. The fuel supply system of claim 2 wherein said catalyst means is selected from a group including nickel, platinum, cobalt, ruthenium and palladium.

4. A fuel supply system for a gas turbine engine having first and second combustion chambers, that includes:

a first combustion chamber supplied with a rich hydrocarbon fuel generating exhaust gas containing carbon monoxide, oxides of nitrogen, unburned hydrocarbons, water vapor and hydrogen and having an exhaust opening;

a second combustion chamber supplied with a hydrocarbon lean and hydrogen enriched fuel and having an inlet opening;

conduit means connecting said exhaust opening with said inlet opening; and water-gas shift catalyst means located in said conduit between said combustion chambers wherein said exhaust gas is converted to a mixture containing hydrogen and carbon dioxide and for supplying said mixture to said second combustion chamber wherein said mixture is mixed with additional air and burned for powering the engine and producing an exhaust gas containing reduced amounts of oxides of nitrogen and reduced amounts of unburned hydrocarbons.

5. The fuel supply system of claim 4 wherein said catalyst means is selected from a group including nickel, platinum, cobalt, ruthenium and palladium.

6. An improved engine fuel supply system that comprises:

means for supplying hydrocarbon rich fuel;

a first combustion chamber in the engine for producing exhaust gas containing carbon monoxide, oxides of nitrogen, unburned hydrocarbons, water vapor and hydrogen;

a second combustion chamber in the engine;

conduit means connecting said combustion chambers; and water-gas shift catalyst means located in said conduit means for receiving said exhaust gas from said first combustion chamber, for producing a mixture containing hydrogen and carbon dioxide, and for delivering said mixture to said second combustion chamber wherein said mixture and air are mixed and burned to power the engine producing an exhaust having reduced amounts of oxides of nitrogen and reduced amounts of unburned hydrocarbons.

7. The fuel supply system of claim 6 wherein said system also includes:

a first carburetor for mixing fuel and air in a hydrocarbon rich mixture; and a second carburetor for mixing fuel and air in a hydrocarbon lean mixture.

8. The fuel supply system of claim 6 wherein said catalyst means is selected from a group including nickel, platinum, cobalt, ruthenium and palladium.

9. The fuel supply system of claim 7 wherein said catalyst means is selected from a group including nickel, platinum, cobalt, ruthenium and palladium.

10. A fuel combustion process for engines that reduces emissions of unburned hydrocarbons, carbon monoxide, and oxides of nitrogen, the process includes the steps of:

burning a hydrocarbon rich fuel in a first combustion chamber in the engine producing an exhaust gas containing carbon monoxide, oxides of nitrogen, unburned hydrocarbons, water vapor and hydrogen;

reacting the exhaust gas in the presence of a water-gas shift catalyst to produce a mixture containing hydrogen and carbon dioxide;

mixing said mixture with air to form a hydrocarbon lean and a hydrogen enriched inlet gas; and burning said inlet gas in a second combustion chamber in the engine to power the engine producing engine exhaust containing reduced amounts of unburned hydrocarbons and reduced amounts of oxides of nitrogen.

11. A fuel combustion process for engines that reduces emissions of unburned hydrocarbons, carbon monoxide, and oxides of nitrogen, the process includes the steps of:

burning a hydrocarbon rich fuel in a first combustion chamber in the engine producing an exhaust gas;

reacting the exhaust gas in the presence of a water-gas shift catalyst to produce a reactant gas mixture;

mixing said mixture with air to form a hydrocarbon lean and hydrogen enriched inlet gas; and burning said inlet gas in a second combustion chamber in the engine to power the engine producing engine exhaust containing reduced amounts of unburned hydrocarbons and reduced amounts of oxides of nitrogen.

12. A fuel combustion process for multi-cylinder engines that reduces emissions of unburned hydrocarbons, carbon monoxide, and oxides of nitrogen in the engine exhaust, the process includes the steps of:

forming a hydrocarbon rich fuel/air mixture in a first carburetor, the hydrocarbon rich fuel/air mixture formed above stoichiometric range;

delivering the hydrocarbon rich fuel/air mixture to a first cylinder;

igniting the hydrocarbon rich fuel/air mixture to the first cylinder to produce a first exhaust gas;

delivering the first exhaust gas to a catalytic converter;

enriching the first exhaust gas with additional hydrogen and carbon dioxide in a water-gas shift reaction in the catalytic converter to form an enriched exhaust gas;

delivering the enriched exhaust gas to an intercooler;

cooling the enriched exhaust gas to an inlet manifold;

mixing a fuel-lean, hydrocarbon-air mixture from a second carburetor with the enriched exhaust gas in the inlet manifold to form a second exhaust gas;

delivering the second gas to a plurality of cylinders; and igniting the second gas in the plurality of cylinders to provide power to the engine.

13. A fuel supply system for a gas turbine engine comprising:

a tubular outer housing of a combustion area of the gas turbine, the tubular outer housing formed to have a reduced diameter portion, larger diameter portion, a transition portion between the reduced diameter portion and the larger diameter portion, and a first end;

a first and a second space partition located within the reduced diameter portion;

a first, second, third, and fourth chamber formed by the first and second space partition and the transition portion, the first chamber located upstream from all the other chambers and the fourth chamber located downstream of all the other chambers;

a gas nozzle for delivering a hydrocarbon rich fuel located upstream of the reduced diameter portion in the first chamber and extending through the first end;

a conduit for connecting the gas nozzle to a fuel source;

ports formed in the tubular outer shell of the first chamber that allow air to mix with the hydrocarbon rich fuel to form a hydrocarbon rich fuel/air mixture;

an igniter located within the first chamber for igniting the hydrocarbon rich fuel/air mixture to create a first exhaust gas;

means for delivering the first exhaust gas through the first space partition and into the second chamber;

a catalytic converter located in the second chamber for receiving the first exhaust gas and enriching the first exhaust gas with hydrogen and carbon dioxide in a water-gas shift reaction to form a second exhaust gas;

means for delivering the second exhaust gas to the third chamber;

ports formed in the tubular outer shell of the third chamber for mixing air with the second exhaust gas to form a hydrocarbon lean and hydrogen enriched mixture;

means for delivering the hydrocarbon lean and hydrogen enriched mixture to the fourth chamber;

a second igniter that is located in the fourth chamber for igniting the hydrocarbon lean and hydrogen enriched mixture; and a turbine wheel for harnessing the power developed by the ignition of the hydrocarbon lean and hydrogen enriched mixture from the fourth chamber.

* * * * *